(Model.)

G. D. GADDIS.
TIRE TIGHTENER.

No. 379,950. Patented Mar. 27, 1888.

ATTEST.
J. Henry Kaiser
Victor J. Evans.

INVENTOR.
George D. Gaddis
By S. W. Bates
Atty.

United States Patent Office.

GEORGE DAVIS GADDIS, OF EAST MACHIAS, MAINE.

TIRE-TIGHTENER.

SPECIFICATION forming part of Letters Patent No. 379,950, dated March 27, 1888.

Application filed November 15, 1886. Serial No. 218,977. (Model.)

*To all whom it may concern:*

Be it known that I, GEORGE DAVIS GADDIS, a citizen of the United States, residing at East Machias, in the county of Washington and State of Maine, have invented a Tire-Tightener and Felly-Supporter for Vehicle-Wheels, of which the following is a specification.

My invention relates to devices for securing tires firmly in their position on the rim of the wheel by expanding the felly which holds the tire.

The loosening and falling off of wheel-tires has always been a source of annoyance and expense to the owners of vehicles of all kinds. This is mainly caused by the shrinkage of the felly, whereby its diameter is decreased and the tire correspondingly loosened. To remedy this difficulty extensible spokes have been resorted to, such spokes being capable of slight elongation, whereby the segments of the felly could be pressed outward against the tire and so bind the two parts of the wheel tightly together.

It is the aim of my invention to provide a device for lengthening the spokes of wheels, which shall be cheaply made, strong, and durable.

My invention consists of a clasp for embracing the felly, said clasp having a threaded screw projecting inward toward the center of the wheel, and a sleeve having formed at one end a nut adapted to engage said screw, the other end being adapted to receive the end of the spoke.

I illustrate my invention by means of the accompanying drawings, in which—

Figure 1:
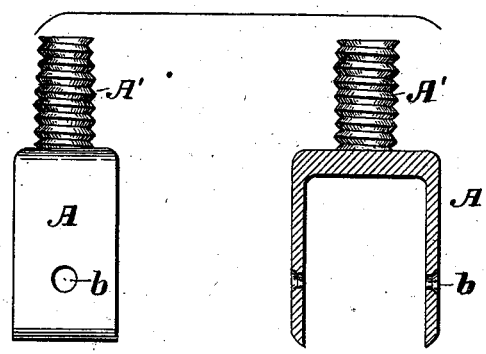
Figure 2:
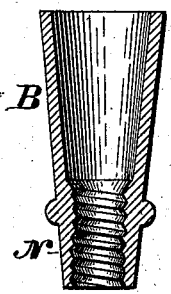
Figure 3:
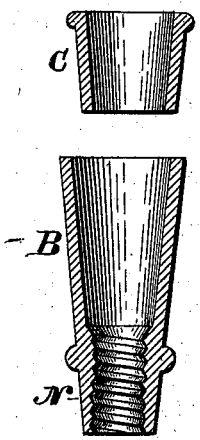
Figure 4:
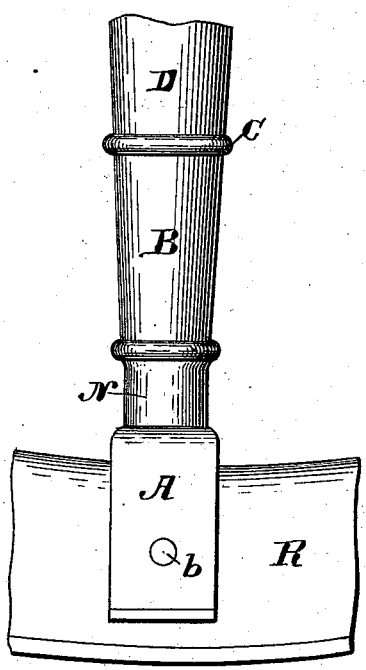

Figure 1 represents a side and a front view of the clasp. Fig. 2 represents a longitudinal section through the ferrule which fits the end of the spoke. Fig. 3 represents a like view of the sleeve. Fig. 4 is a general side view of the device in position in a wheel.

The clasp A is adapted to fit over the inner edge of the felly, and it has formed integral with it or secured to it the screw A', which projects inward toward the center of the wheel. The clasp A is secured to the felly by means of a rivet which passes through the holes *b*.

B is a sleeve having formed at one end a nut, N, adapted to engage the screw A', the other end being adapted to receive the ferrule C, which is fixed to the end of the spoke D.

The ferrule C has a fillet, *c*, against which rests the edge of the sleeve B when in position. Both the ferrule C and the sleeve B are here shown to be slightly tapering; but although I consider this the preferable construction it is not essential.

The operation of my device is evident from its construction. When the sleeve B is turned in the proper direction, by applying a wrench to the nut N the felly is pressed outward against the tire, the sleeve B turning freely on the ferrule C, and the clasp B being forced away from the nut N by the operation of the screw. As the felly shrinks, it is only necessary to tighten up the nut N on the spokes of the wheel, thereby keeping the latter in a good condition and preventing all rattling.

I claim—

1. The herein-described device for lengthening wheel-spokes, which consists of a clasp to inclose the inner edge of the felly, said clasp having formed on it an inward-projecting screw, a ferrule having formed at one end a nut adapted to engage said screw and at the other a socket, and a ferrule adapted to fit the end of the spoke and said socket, in combination, substantially as described.

2. The combination of the clasp having formed thereon a screw, and the sleeve having on one end a nut adapted to engage said screw and on the other end a socket adapted to receive the end of the tire, substantially as described.

GEORGE DAVIS GADDIS.

Witnesses:
 SYLVANUS S. HALL,
 FRED. A. HALL.